US008756636B1

(12) United States Patent
Wasden et al.

(10) Patent No.: US 8,756,636 B1
(45) Date of Patent: Jun. 17, 2014

(54) METHOD AND SYSTEM FOR TESTING AN INTEGRATED RECEIVER DECODER WITH SIGNALS FROM OUTSIDE THE LOCAL MARKET AREA

(75) Inventors: Mitchell B. Wasden, Redondo Beach, CA (US); Vishal Arya, Los Angeles, CA (US); Darren M. St. Laurent, Stevenson Ranch, CA (US); Charles S. Tellez, Whittier, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 667 days.

(21) Appl. No.: 12/840,029

(22) Filed: Jul. 20, 2010

(51) Int. Cl.
*H04N 7/173* (2011.01)

(52) U.S. Cl.
USPC ............................... 725/63; 725/68; 455/3.02

(58) Field of Classification Search
None
See application file for complete search history.

(56) References Cited

U.S. PATENT DOCUMENTS

| | | | | | |
|---|---|---|---|---|---|
| 4,739,510 | A | * | 4/1988 | Jeffers et al. | 380/234 |
| 5,276,904 | A | * | 1/1994 | Mutzig et al. | 725/68 |
| 5,483,663 | A | * | 1/1996 | Tawil | 725/68 |
| 6,634,027 | B1 | * | 10/2003 | Johnson | 725/67 |
| 6,735,437 | B2 | * | 5/2004 | Mayfield et al. | 455/427 |
| 6,892,050 | B1 | * | 5/2005 | Tawil et al. | 455/12.1 |
| 6,975,837 | B1 | * | 12/2005 | Santoru | 455/12.1 |
| 6,983,123 | B2 | * | 1/2006 | Tawil et al. | 455/3.02 |
| 7,016,646 | B2 | * | 3/2006 | Mayfield et al. | 455/12.1 |
| 7,055,166 | B1 | * | 5/2006 | Logan et al. | 725/32 |
| 7,257,370 | B2 | * | 8/2007 | Anderson | 455/12.1 |
| 7,853,197 | B2 | * | 12/2010 | Tawil et al. | 455/3.02 |
| 2003/0217361 | A1 | * | 11/2003 | LoMonaco et al. | 725/63 |
| 2003/0217362 | A1 | * | 11/2003 | Summers et al. | 725/63 |
| 2004/0078743 | A1 | * | 4/2004 | Jensen et al. | 714/746 |
| 2006/0064726 | A1 | * | 3/2006 | Loner | 725/68 |
| 2007/0186251 | A1 | * | 8/2007 | Horowitz et al. | 725/63 |
| 2009/0070822 | A1 | * | 3/2009 | Barroso | 725/63 |
| 2009/0070824 | A1 | * | 3/2009 | Barroso | 725/67 |
| 2009/0070827 | A1 | * | 3/2009 | Barroso | 725/68 |

* cited by examiner

*Primary Examiner* — Fernando Alcon

(57) ABSTRACT

A system and method for monitoring a plurality of local channel signals that includes a monitoring system for receiving the plurality of local channel signals and for converting channel signals into RF signals. The system also includes a combiner for combining the RF signals with national signals to form a combined signal and an integrated receiver decoder and a router communicating at least one of the combined signals to an input of the integrated receiver decoder. A display associated with the integrated receiver decoder displays at least one of one of the RF signals.

37 Claims, 10 Drawing Sheets

METHOD AND SYSTEM FOR TESTING AN INTEGRATED RECEIVER DECODER WITH SIGNALS FROM OUTSIDE THE LOCAL MARKET AREA

TECHNICAL FIELD

The present disclosure relates generally to communication systems, and, more particularly, to a method and system for testing an integrated receiver decoder with signals from outside the local market area.

BACKGROUND

The statements in this section merely provide background information related to the present disclosure and may not constitute prior art.

Satellite broadcasting of television signals has increased in popularity. Satellite television providers continually offer more and unique services to their subscribers to enhance the viewing experience. Providing reliability in a satellite broadcasting system is therefore an important goal of satellite broadcast providers. Providing reliable signals reduces the overall cost of the system by reducing the number of received calls at a customer call center.

In satellite broadcasting systems, users have come to expect the inclusion of local channels in addition to the channels broadcast for the entire Continental United States. Collecting the channels may be performed in various manners, including providing a manned station that receives the signals. The signals may be uplinked from various locations.

When a satellite broadcasting service provider provides additional channels, services, or additional areas of services, the hardware used by the users may be affected. For example, when providing new local service to an area, the set top boxes or integrated receiver decoders may be affected. Many satellite service providers have a number of different models and, thus, different changes may affect different models in various ways. Providing testing personnel and resources for monitoring every change or additional service is cost-prohibitive.

SUMMARY

The present disclosure provides a system and method for remotely monitoring signals for different designated marketing areas at a central location. The signals are provided through a terrestrial network from geographically-diverse sites so that the affect on the integrated receiver decoders may be monitored.

In one aspect of the invention, a method includes receiving a plurality of channel signals, uplinking the plurality of channel signals to a satellite, downlinking the plurality of channel signals from the satellite to form downlink signals, converting the selected channel signals into RF signals corresponding to the downlink signal based at a monitoring facility, communicating at least one the RF signals to an input of an integrated receiver decoder within the monitoring facility and displaying one of the RF signals at a display associated with the integrated receiver decoder.

In a further aspect of the invention, a method includes receiving a first plurality of local channel signals at a local collection facility, receiving a second plurality of local channel signals at a second local collection facility, communicating at least one of the first plurality of local channel signals and the second plurality of local channel signals to a remote uplink facility through a terrestrial network, communicating one of the first plurality of local channel signals and the second plurality of local channel signals from the remote facility to a monitoring facility to form selected local channel signals, converting the selected local channel signals into RF signals, communicating at least one the RF signals to an input of an integrated receiver decoder and displaying one of the RF signals at a display associated with the integrated receiver decoder.

In a further aspect of the invention, a system includes a monitoring system for receiving a plurality of local channel signals and for converting local channel signals into RF signals. The system also includes a combiner for combining the RF signals with national signals to form a combined signal and an integrated receiver decoder and a router communicating at least one the combined signals to an input of the integrated receiver decoder. A display associated with the integrated receiver decoder displays at least one of one of the RF signals.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
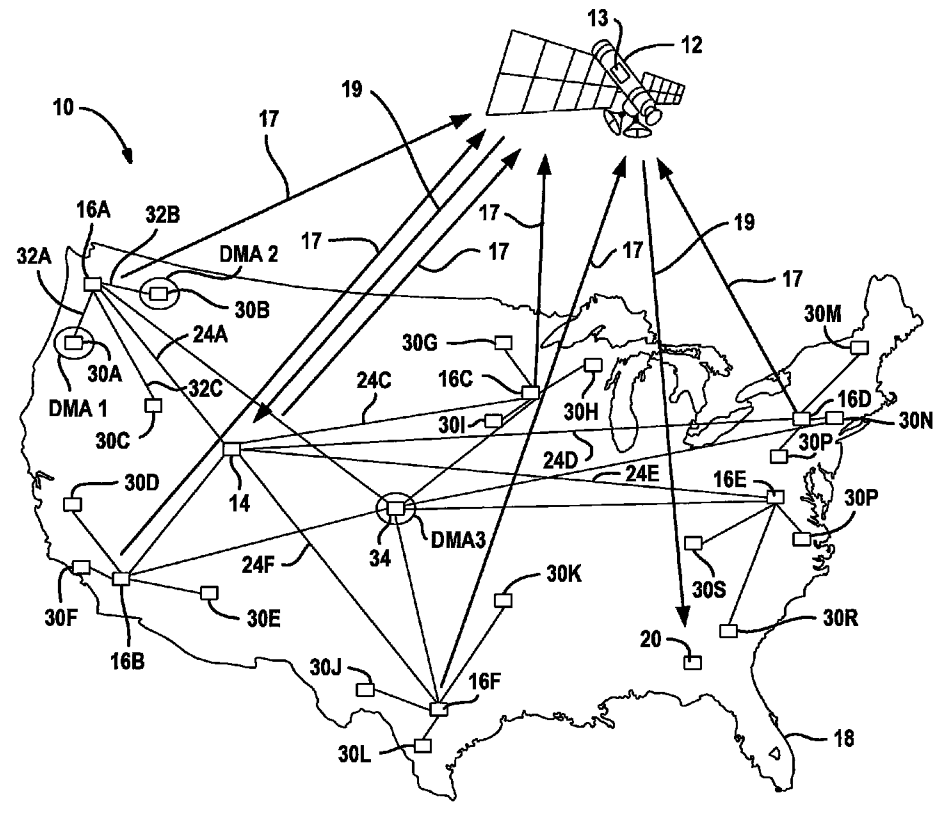
FIG. 1 is an overall system view of a collection and communication system in the continental United States.

The following description is merely exemplary in nature and is not intended to limit the present disclosure, application, or uses. It should be understood that throughout the drawings, corresponding reference numerals indicate like or corresponding parts and features.

As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Referring now to FIG. 1, a collection and communication system 10 includes a satellite 12 that includes at least one transponder 13. Typically, multiple transponders are in a satellite. Although only one satellite is shown, more than one is possible or even likely. Each transponder 13 may be used to communicate various signals including television channel signals, program guide signals, authorization signals and software update signals for the user devices associated with the system 10.

The collection and communication system 10 includes a central facility or Network operations center (NOC) 14 and a plurality of regional or remote uplink facilities (RUF) 16A, 16B, 16C, 16D, 16E and 16F. In a non-satellite system the facilities may be referred to as a remote facility. The regional or remote uplink facilities 16A-16F may be located at various locations throughout a landmass 18 such as the continental United States, including more or less than those illustrated. The regional or remote uplink facilities 16A-16F uplink various uplink signals 17 to satellite 12. The satellites downlink signals 19 to various users 20 that may be located in different areas of the landmass 18. The users 20 may be mobile or fixed users. The uplink signals 17 may be digital signals such as digital television signals or digital data signals that may include program guide data and software updates for devices associated with the users. The digital television signals may be high definition television signals, standard definition signals or combinations of both. Uplinking may be performed at various frequencies including Ka band. The present disclosure, however, is not limited to Ka band. However, Ka band is a suitable frequency example used throughout this disclosure. The central facility or NOC 14 may also receive downlink signals 19 corresponding to the uplink signals 17 from the various regional or remote uplink facilities and from itself for monitoring purposes. The central facility 14 may monitor and control the quality of all the signals broadcast from the system 10.

The central facility 14 may also be coupled to the regional or remote uplink facilities through a network such as a computer network having associated communication lines 24A-24F. Each communication line 24A-F is associated with a respective regional or remote uplink site 16. Communication lines 24A-24F are terrestrial-based lines. As will be further described below, all of the functions performed at the regional or remote uplink facilities may be controlled centrally at the central facility 14 as long as the associated communication line 24A-F is not interrupted. When a communication line 24A-F is interrupted, each regional or remote uplink site 16A-F may operate autonomously so that uplink signals may continually be provided to the satellite 12. Each of the regional or remote uplink and central facilities includes a transmitting and receiving antenna which is not shown for simplicity in FIG. 1.

Each of the regional or remote uplink facilities 16A-16F may also be in communication with a local collection facility collectively referred to with reference numeral 30. As illustrated in FIG. 1, three local collection facilities are associated with each remote uplink facility 16. For example, remote uplink facility 16A has local collection facilities 30A, 30B and 30C associated therewith. Local collection facilities 30D-30S are associated with one of the other remote uplink facilities 16B-16F. Although only three local collection facilities are illustrated for each remote uplink facility 16, numerous local collection facilities may be associated with each remote uplink facility 16. The number of local collection facilities 30 may be numerous, such as 40 for each remote uplink facility. The number of local collection facilities 30 is limited by the amount of equipment and the capabilities thereof associated with each remote uplink facility 16.

The local collection facilities 30 are used for collecting local television stations in various designated marketing areas (DMA). As is illustrated, local collection facility 30A is located in DMA1 and local collection facility 30B is located in DMA2. For simplicity, only two DMAs are illustrated. However, each local collection facility may be located in a DMA.

The local collection facilities 30 may be in communication with each remote uplink facility 16 through a communication network 32. As will be described below, the communication network 32 may be an internet protocol (IP) network. The signals from the local collection facilities 30 may thus be video-over-IP signals. Each of the remote uplink facilities 16 are in communication with each local collection facility 30 through the communication network 32. As is illustrated, local collection facility 30A is in communication with the remote uplink facility 16A through communication network 32A, while local collection facility 30B is in communication with the remote uplink facility 16A through communication network 32B, and so on. Collectively, the communication network will be referred to with reference numeral 32.

A monitoring facility 34 may be in communication with one or more remote uplink facilities 16. The monitoring facility 34 is illustrated as a separate facility in a separate designated marketing area as the other designated areas DMA1 and DMA2. The monitoring facility 34 may also be combined with the network operation center 14 or a remote uplink facility 16. The monitoring facility 34 is in communication with the remote uplink facility 16 through the communication network 32. The communication network 32 may communicate television channel signals to the remote facility 34 for monitoring as will be described below.

The monitoring facility 34 may also be in communication with the satellite 12, and more specifically at least one of the transponders 13. The remote facility 34 may receive various signals from the satellite including, but not limited to, program guide signals and software update signals for updating the integrated receiver decoder for the users 20.

Figure 2:
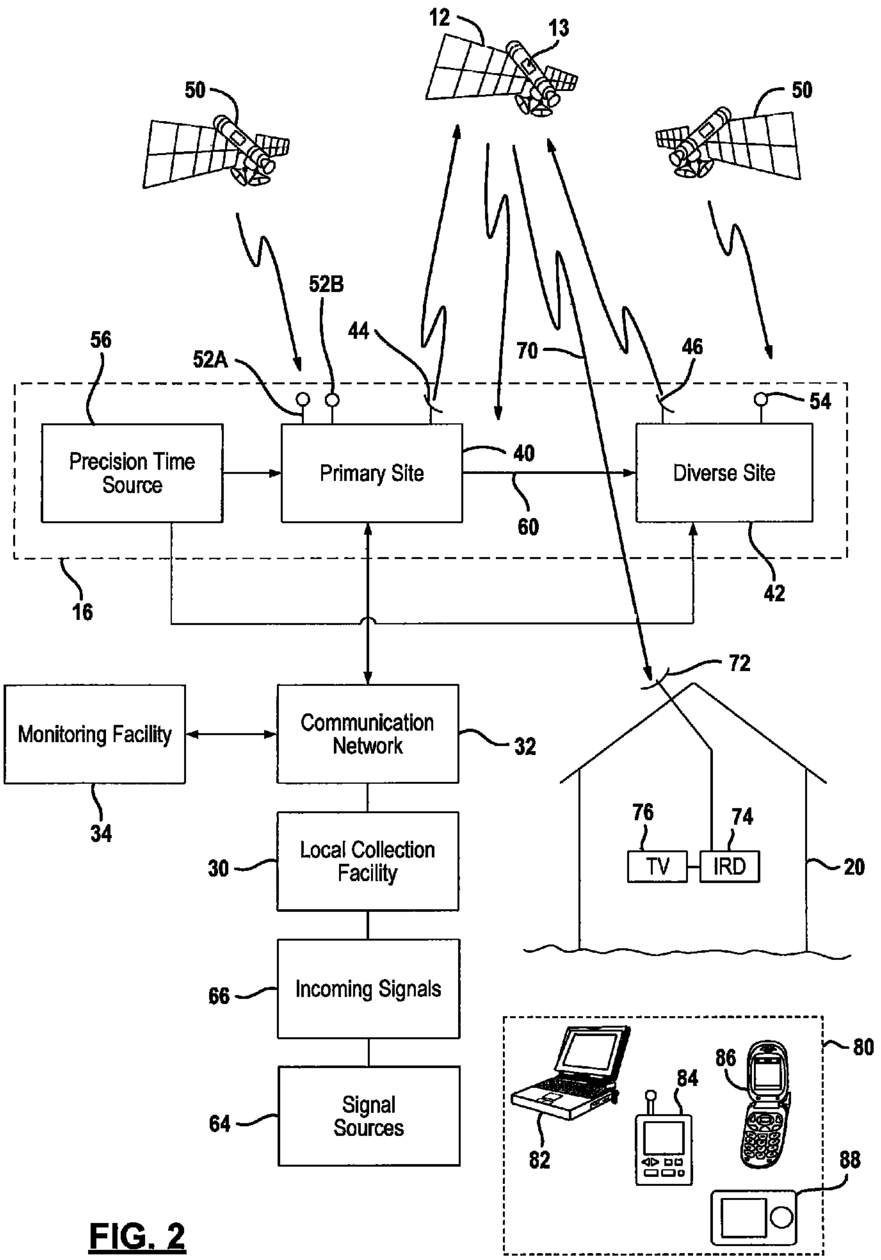
FIG. 2 is a system view at the regional level of the collection and communication system.

Referring now to FIG. 2, the regional or remote uplink facilities 16A-16F of FIG. 1 are illustrated collectively as reference numeral 16. The regional facilities 16 may actually comprise two facilities that include a primary site 40 (such as the remote uplink facility 16 above) and a diverse site 42. The primary site 40 may be referred to as a primary broadcast center (PBC). As will be described below, the central site 14 may also include a primary site and diverse site as is set forth herein. The primary site 40 and diverse site 42 of both the central and regional sites may be separated by at least 25 miles, or, more even more such as, at least 40 miles. In one constructed embodiment, 50 miles was used. The primary site 40 includes a first antenna 44 for transmitting and receiving signals to and from satellite 12. Diverse site 42 also includes an antenna 46 for transmitting and receiving signals from satellite 12.

Primary site 40 and diverse site 42 may also receive signals from GPS satellites 50. GPS satellites 50 generate signals corresponding to the location and a precision timed signal that may be provided to the primary site 40 through an antenna 52 and to the diverse site 42 through an antenna 54. It should be noted that redundant GPS antennas (52A,B) for each site may be provided. In some configurations, antennas 44 and 46 may also be used to receive GPS signals.

A precision time source 56 may also be coupled to the primary site 40 and to the diverse site 42 for providing a precision time source 56. The precision time source 56 may include various sources such as coupling to a central atomic clock. The precision time source 56 may be used to trigger certain events such as advertising insertions and the like.

The primary site 40 and the diverse site 42 may be coupled through a communication line 60. Communication line 60 may be a dedicated communication line. The primary site 40 and the diverse site 42 may communicate over the communication line using a video-over-Internet protocol (IP).

Various signal sources 64 such as an optical fiber line, copper line or antennas may provide incoming signals 66 to the local collection facility 30. Incoming signal 66, as mentioned above, may be television signals. The television signals may be over-the-air high-definition signals, over-the-air standard television signals, or high or standard definition signals received through a terrestrial communication line. The incoming signals 66 such as the television signals may be routed from the local collection facility 30 through the communication network 30 to the primary site 40, or the diverse site 42 in the event of a switchover. The switchover may be manual or a weather-related automatic switchover. A manual switchover, for example, may be used during a maintenance condition.

Users 20 receive downlink signals 70 corresponding to the television signals. Users 20 may include home-based systems, business-based systems or multiple dwelling unit systems. As illustrated, a user 20 has a receiving antenna 72 coupled to an integrated receiver decoder (IRD) 74 that processes the signals and generates audio and video signals corresponding to the received downlink signal 70 for display on the television or monitor 76. It should also be noted that satellite radio receiving systems may also be used in place of the IRD 74. The integrated receiver decoder 74 may be incorporated into or may be referred to as a set top box.

The user 20 may also be a mobile user. The user 20 may therefore be implemented in a mobile device or portable device 80. The portable device 80 may include but are not limited to various types of devices such as a laptop computer 82, a personal digital assistant 84, a cellular telephone 86 or a portable media player 88.

It should be noted that multiple remote uplink facilities 16 may be in communication with the communication network 32. One or more monitoring facilities 34 may be in communication with the remote uplink facilities through the communication network 32.

Figure 3:
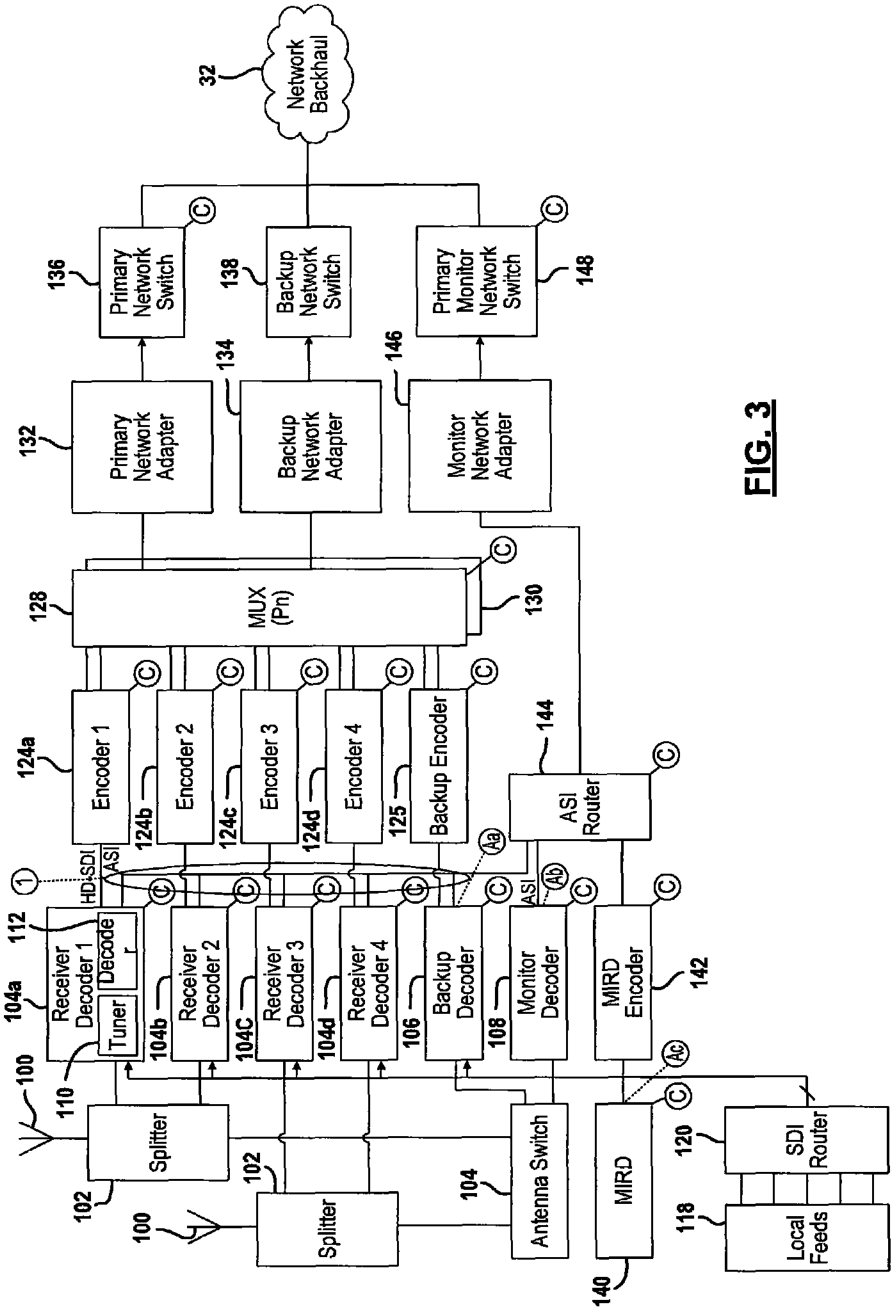
FIG. 3 is a detailed block diagrammatic view of a local collection facility illustrated in FIGS. 1 and 2.

Referring now to FIG. 3, the local collection facility 30 is illustrated in more detail. As mentioned above, the local collection facility 30 is in communication with the remote uplink facility 16 through a network 32 such as an ATM network. The local collection facility 30 is used for collecting local channel signals in a designated marketing area or other area. The channel signals may be received as over-the-air television signals or through a direct local feed such as an optical fiber or wire. For an over-the-air signal, an antenna or plurality of antennas 100 are provided. The antenna channel signals are directed to splitters 102. The splitter signals are communicated to a plurality of receiver circuit modules 104A-D (collectively referred to as 104). The number of receiver circuit modules 104 depends upon various design parameters such as how many channels the designated market includes. Various numbers of receiver circuit modules 104 may be provided.

In addition to the receiver circuit modules 104A-D, a back-up receiver circuit module 106 may also be coupled to the splitters 102. Also, a monitor receiver circuit module 108 may be included at the local collection facility 108.

The receiver circuit modules generally 104, 106 and 108 include a tuner module 110 and a decoder module 112. The receiver circuit module 104 is used to tune, demodulate and decode the over-the-air signals. The tuner may be fixed-tuned to a particular channel or may be adjustable. The receiver circuit modules 104A-D are suitable for fixed tuning. The back-up receiver module 106 and monitor receiver circuit module 108 are particularly suited for multi-channel tuning. The receiver circuit modules, as will be described below may include an ATSC receiver or an NTSC receiver. In ATSC form the receiver receives an MPEG2 signal. The decoding may thus be MPEG2 decoding.

The receiver circuit modules 104 may generate a high definition serial digital interface signal (HD SDI) and an asynchronous serial interface (ASI) signal.

The back-up receiver circuit module 106 and the monitor receiver module 108 may be in communication with an antenna switch 114. The antenna switch 114 is in communication with the splitters 102 which are in communication with the antennas 100. The antenna switch 114 may be used to communicate the output of a particular antenna to the back-up receiver decoder 106 and the monitor receiver decoder 108. The back-up receiver decoder 106 may also generate both an HD SDI signal and an ASI signal. The monitor receiver module 108 may be used to generate only an ASI signal.

A serial digital interface router 120 may also be provided. The serial digital interface router 120 may be a high definition serial digital interface router. The router 120 may receive local feeds 118 directly from the local channel providers. The feeds may also be in MPEG2 format. These may be provided through a wire or optical fiber. The router 120 routes the channel signals received from the local feeds 118 to the receiver circuit modules 104, 106, 108 where received signals are decoded from MPEG2 format.

The received signals are processed and encoded into a format such an MPEG4 format in the encoders 124A-D. A back-up encoder 126 associated with the backup receiver decoder may also be provided.

The output of the encoders 124A-D, 126 are in communication with a primary multiplexer 128 and a back-up multiplexer 130. The primary multiplexer 128 an the back-up multiplexer 130 multiplex the encoded signals and provide them to a primary network adapter 132 and a back-up network adapter 134. Both the primary network adapter 132 and the back-up network adapter 134 may be in communication with the primary multiplexer 128 and the back-up multiplexer 130. The network adapters 132, 134 receive the multiplexed signals and format them into a format such but not limited to as internet protocol (IP) or an asynchronous transfer mode (ATM) configuration. Once the multiplexed signals are converted into the desired format, the primary network adapter 132 or the back-up network adapter 132 routes the signals through a primary switch 136 or a back-up switch 138. The primary switch 136 and the back-up switch 138 are used to route the signals formed by the primary or network adapter from an input port to an output port to provide a connection between the switches 136 or 138 and the remote facility 16.

The local collection facility 30 may also include a monitoring integrated receiver decoder (MIRD) 140. The output of the monitoring IRD 140 may be provided to an MIRD encoder 142. The IRD 140 may also be referred to as a set top box. The monitoring IRD 140 receives downlinked satellite signals and converts these signals to a decoded signal (HD SDI, for example). The MIRD encoder 142 encodes the signals in a format such as MPEG 4 format.

The output of the monitor IRD encoder 142 may be provided to an ASI router 144. The ASI router 144 may route input signals from the decoders 104A-D, the back-up receiver decoder 106, the monitor receiver decoder 108 and the monitoring IRD encoder 142. The signals are routed through the router 144 for monitoring at a monitoring system, as will be described below. The monitoring system may also control the devices mentioned above through the router 144. Controlling may be switching to a backup. The monitoring system may also be in communication with the encoder 124A-D and 126, the multiplexers 128, 130 and the switches 136-148. The output of the router is provided to a monitor network adapter 146 and a primary monitor switch 148. The monitor network adapter 146 adapts the signal to the desired format. The format signals provided to the primary monitor switch 148 which in turn communicates through the backhaul 32.

Figure 4:
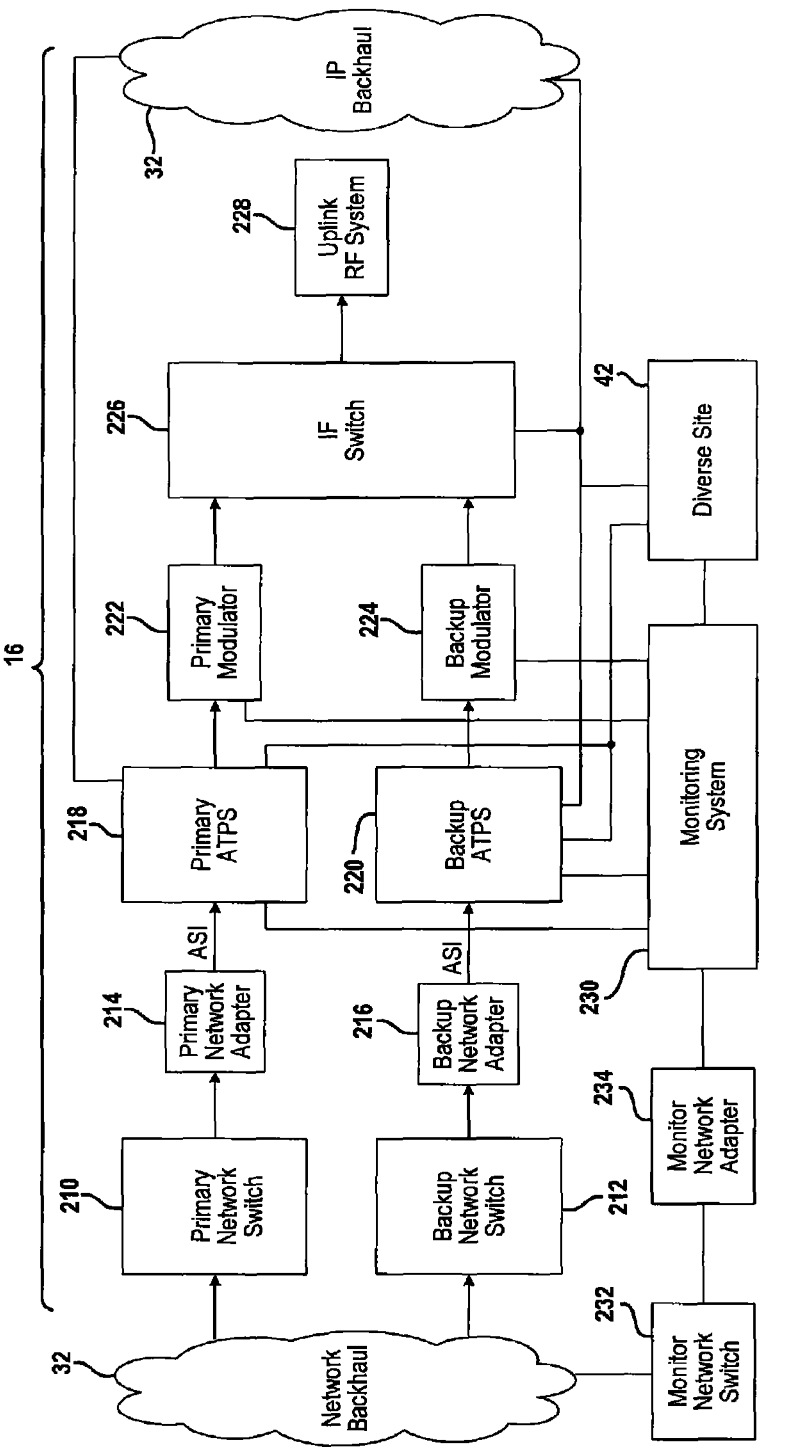
FIG. 4 is a detailed block diagrammatic view of a remote uplink facility.

Referring now to FIG. 4, the remote uplink facility 16 may include a primary switch 210 and a back-up switch 212 in communication with the network 32. The primary switch 210 and the back-up switch 212 are in communication through the network 32 with the primary switch 136 and the back-up switch 138. The primary switch 210 is in communication with a primary network adapter 214. The back-up switch 212 is in communication with a back-up network adapter 216. The network adapters 214 and 216 are used to generate an Asynchronous Serial Interface (ASI) signal that is communicated to a respective primary advanced transport processing system (ATPS) 218 and a back-up advanced transport processing system (ATPS) 220. The advanced transport processing systems 218, 220 convert the ASI signals from the network adapters into an advanced transport stream such as a DIRECTV® A3 transport stream. The ATPS 218, 220 may act as an encryption module for inserting encryption into the transport stream.

The primary ATPS 218 and the backup ATPS 220 may provide ASI signals to the network 32. Although ultimately the signals from the ATPS 218, 220 may be provided to the monitoring facility 34.

A primary modulator 222 and a back-up modulator 224 receive the transport stream from the respective primary ATPS 218 or the back-up ATPS 220. The primary modulator 222 and the back-up modulator 224 modulate the transport stream and generate an RF signal at a frequency such as an L-band frequency. An RF switch 226 may be referred to as an intermediate frequency switch 226. The RF switch provides one output signal to the uplink RF system 228. The uplink signal may then be communicated to the satellite 12 of FIG. 1. Should the system not be a satellite system, the signal may be communicated terrestrially through a distribution system in a wired or wireless manner. Several circuits 210-226 may be included in a remote facility 16, each one corresponding to one transponder on the satellite.

A monitoring system 230 may be in communication with a monitor switch 232 and a monitor network adapter 234 for communicating with the various local collection facilities. In addition, the monitoring system 230 may be in communication with the primary ATPS 218, the back-up ATPS 220, the primary modulator 222 and the back-up modulator 224. In addition, the monitoring system 230 may be in communication with the router 144 illustrated in FIG. 3. The router 144 may be in communication with the monitor receiver circuit module 108, the monitor IRD encoder 142 and each of the receiver circuit modules 104, 106. The monitoring system 230 may be referred to as an advanced broadcast monitoring system 230.

It should be noted that multiple local collection facilities 30 may be coupled to a remote collection facility 16.

It should be noted that the diverse uplink facility or diverse site 54 illustrated in FIG. 4 may include a primary and back-up ATPS, a modulator and RF switch. The monitoring system may control the signals to the diverse site 42. The outputs of the primary ATPS 218, 220 may also be communicated to the diverse site 42. The diverse site may be used for uplinking signals to the satellite.

Figure 5:
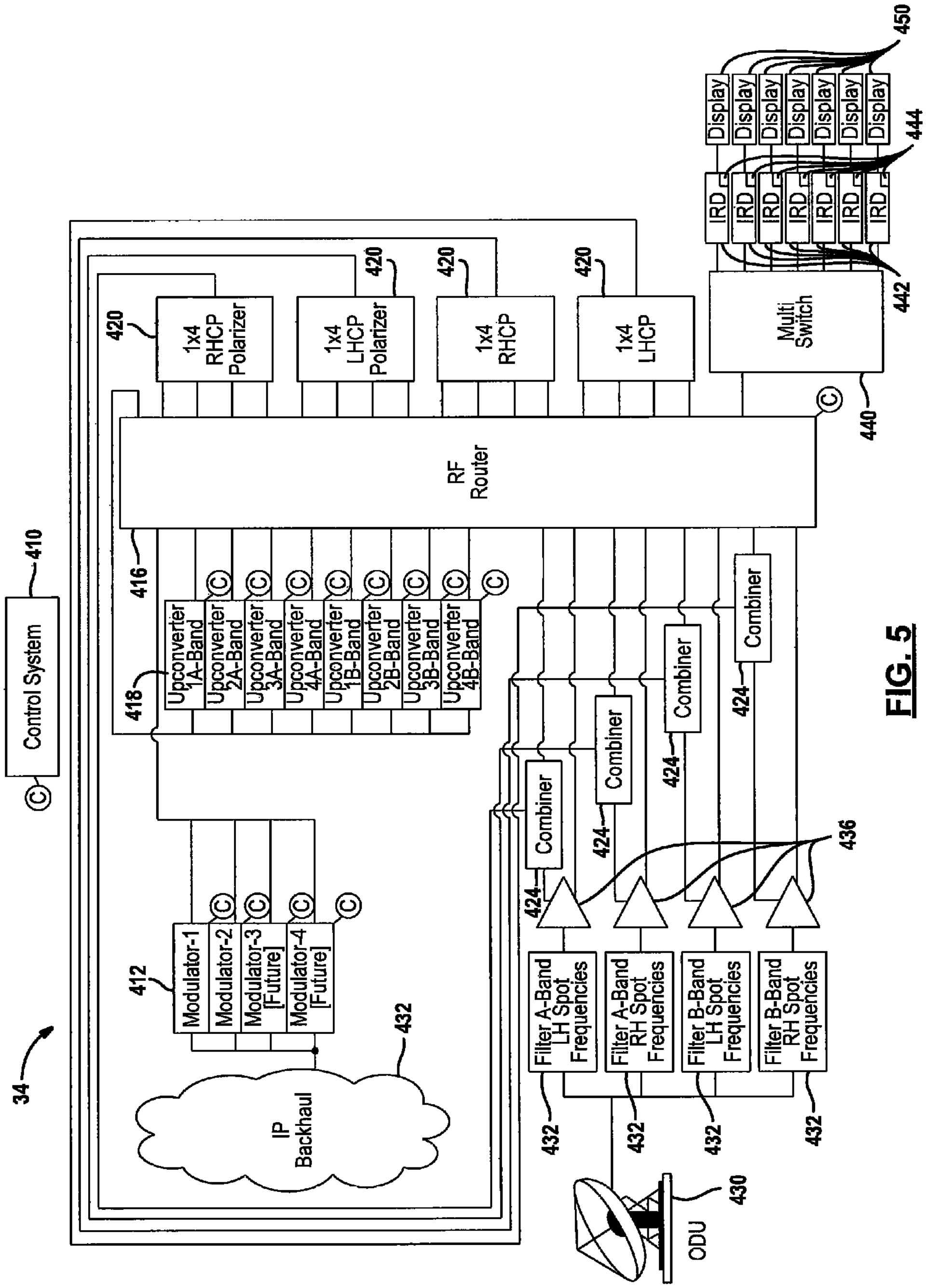
FIG. 5 is a block diagrammatic view of a monitoring system according to a first embodiment of the present disclosure.

Referring now to FIG. 5, the monitoring facility 34 is illustrated in further detail. The monitoring facility 34 is in communication with the network 32. The network 32 may be an internet protocol back haul. The network 32 may be in communication with the remote uplink facilities 16. The remote uplink facilities communicate the multiplexed ASI signals from either a primary ATPS or a backup ATPS. The monitoring system 34 may be controlled by a control system 410. The control system 410 may include a computer system and monitor so that an operator can control the system as described below. The control system 410 may be in communication with various components to monitor and control the various components. The connection between the control system 410 and the various components is indicated by "C" attached to each of the components. The actual connections have not been drawn to simplify the drawing. The IP backhaul 432 is used to receive signals from the remote facilities that originate from a local collection facility. These signals received will be used for insertion into a CONUS signal to simulate a signal received by a set top box or user device in another geographic location.

The IP backhaul 32 may be in communication with one or more modulators 412. In the present figure, two modulators 412 are illustrated for current use. Future modulators are also illustrated. Future modulators may be provided should the need for more monitoring exist. The modulators 413 are used to modulate the received ASI signal into an RF signal. The modulated signal is communicated through a network within the monitoring facility.

The output of the modulator 412 is communicated to a router 416. The RF router 416 is used to route the signals to one of the upconverters 418. The upconverter 418 upconverts the frequency of the modulated signal from the modulator 412. The combination of the process performed in the modulator 412 and the upconverter 418 provides the channel signals with the same format as the corresponding channel signals downlinked to the user's integrated receiver decoders from the satellite. The format may include frequency and polarization. That is, the output of the upconverter 418 has a frequency corresponding to the frequency of the corresponding downlink signals for the channel signals originating at the corresponding remote uplink facility. From the IRD perspective, the RF signals are the same. This allows the simulation to take place within the monitoring system 34 using precisely the same conditions as a user's integrated receiver decoder. The signals from the upconverter 418 are also communicated to the RF router 416. The RF router 416 routes the upconverter signals to one of the polarizers 420. Each of the polarizers 420 may be used for polarizing in a different manner. For example, the polarizers may be divided into right-hand circularly polarized signals and left-hand circularly polarized signals. In this example, different frequency ranges may also be provided for each polarizer. The output of the polarizer 420 thus matches the uplink signal that is provided at the corresponding remote uplink facility.

In one example of a proper tuning frequency, to modulate a carrier at 1691.67 Mhz, the modulator frequency may be provided at 70.67 Mhz and the upconverter may be selected to 1691 MhZ. The modulators 412 may be used for modulating the decimal portion of the desired signal, wherein the upconverter may be used to convert the integer portion of the desired signal.

The output of each of the polarizers 420 is provided to a respective plurality of combiners 424. The output of the combiners 424 may be provided to the RF router 416. Another input to the combiner is the output of an outdoor unit or plurality of outdoor units 430. The outdoor unit 430 may be a standard outdoor unit used for receiving signals from the satellite. The outdoor unit may consist of an antenna such as a dish antenna and a low-noise block used for down converting the frequencies of the received satellite signals.

The output of the outdoor unit 430 may be in communication with a filter 432. In this example, four filters 432 are illustrated for filtering left-hand polarized and right-hand polarized filters in two different bands (A-band and B-band). The filters 432 may be used for filtering conflicting spot beam frequencies. The filters 432 are used to filter out local signals from the location of the monitoring system. No signal from other local markets can be inserted therein at the combiners 424. This process will be described below in detail in FIG. 7 below.

The output of the filters 432 are provided to respective amplifiers 436. The output of the amplifiers may be routed to both the router 416 and to a respective combiner 424.

A multi-switch 440 may be in communication with the RF router 416. The multi-switch 440 may be used to provide channel signals to each IRD 442. The IRDs 442 may include a conditional access module 444 that is programmed to receive signals from a designated marketing area to be tested.

The outdoor unit 430 is used to receive software upgrades, authorization signals such as conditional access packets for enabling the IRD 442, and for receiving program guide signals. The outdoor unit 430 may also be used for receiving broadcast on Continental United States (CONUS) program television channel signals. The program guide signals, the authorization signal and the software upgrades may be broadcasted on CONUS signals from the satellite. Therefore, each of the program guide elements for each of the designated marketing areas is available across the country and thus is available to each IRD 442 even in another jurisdiction. The IRD 442 is thus configured in a similar manner to a consumer IRD except for the conditional access module 444 that is programmed for receiving the signals for the designated marketing area to be tested rather than the geographical location of the monitoring system. The authorization signals are signals used for enabling the integrated receiver decoder to receive various programming. Thus, the monitoring system 34 may be located in a different designated marketing area from the signals to be tested. In summary, the local channel signals are received through a terrestrial network 32 and are modulated and up converted to resemble the signals from a spot beam in the designated marketing area to be tested. The other portions are other portions of signals received from the IRD such as the CONUS television signals, software updates and program guide signals are communicated through the ODU 430 through the combiners 424, through the RF router 416 to the multi-switch 440 which in turn communicates the signals to the IRD 442.

It should be noted that the combiner 424 may be bypassed to eliminate conflicts within the multi-switch 440. This is due to the fact that two markets may be on the same frequencies since the spot beams for the designated marketing areas are re-used throughout the country.

Figure 6:
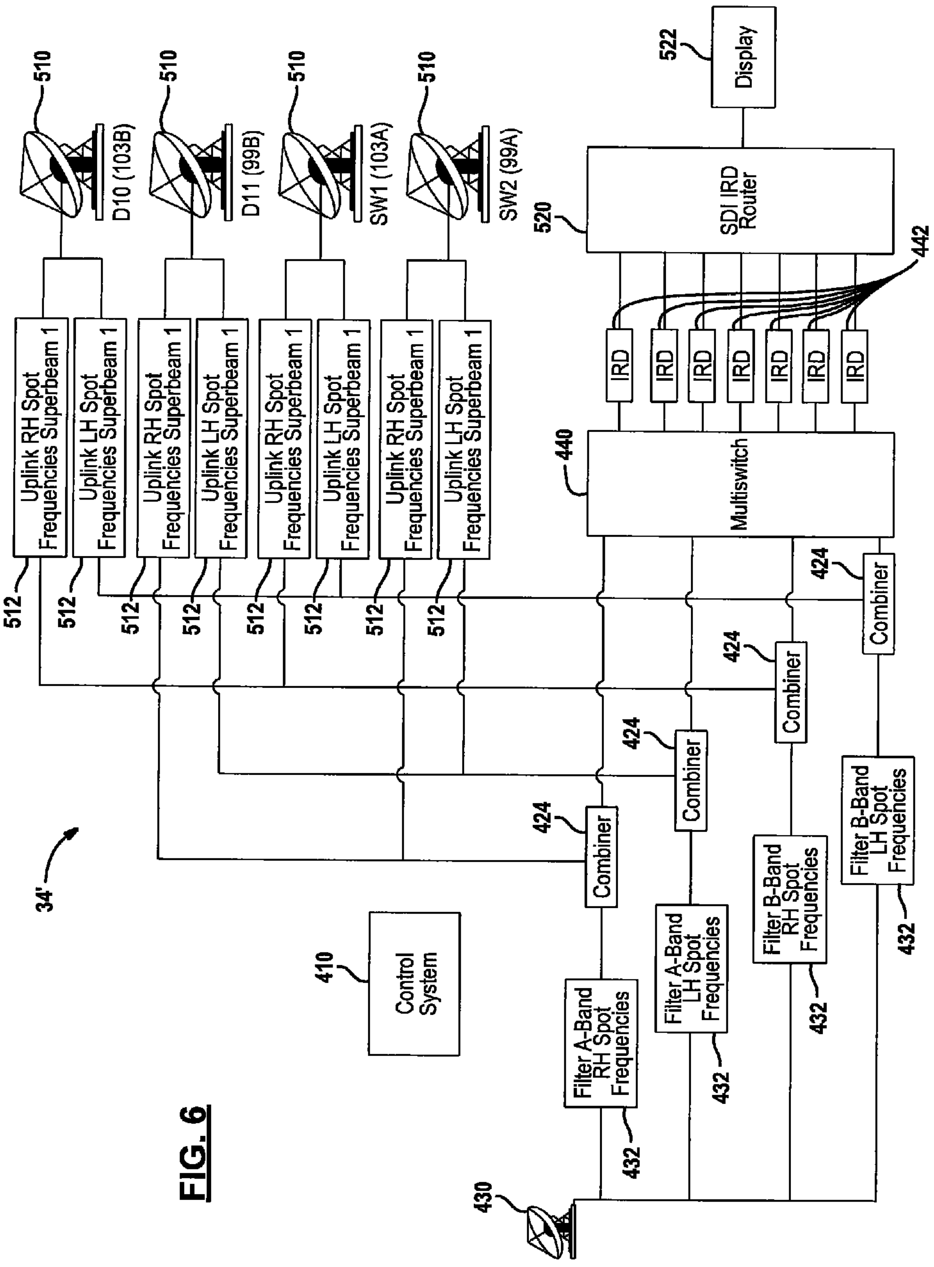
FIG. 6 is a block diagrammatic view of a monitoring system according to a second embodiment of the present disclosure.

Referring now to FIG. 6, an alternative embodiment to the monitoring system 34' is illustrated. In this embodiment, the monitoring system 34' may be located at a remote uplink facility 16. The uplink tap at each of the remote uplink facilities may be used to feed the IRDs 442 through the multi-switch 440. In this example, the same reference numerals are used to illustrate the same components from those of FIG. 5. The remote uplink facilities 16 may be used to uplink signals to various satellites. In this example, four uplink antennas 510 are used to uplink signals to four different satellites. In this example, Directv10, Directv11, Spaceway 1 and Spaceway 2 are the satellites located at orbital slots 103B, 99B, 103A, and 99A. It should be noted that the uplink frequencies for the antennas 510 are different than the frequencies for the downlink signals. A converter 512 is used for converting each of the uplink signals into a superbeam that does not interfere with reused frequencies. For example, the L-band uplink frequencies are converted to the proper downlink frequencies in the frequency converters 512.

The combiners 424 do not have a bypass route to the multi-switch since the configuration of the monitoring system 34' is only for one remote uplink facility and not for multiple facilities as illustrated in FIG. 5.

A control system 410 may be used to control various components such as the multi-switch 440.

In this example, the IRDs 442 may be fixed-tuned to a particular viewer channel. The IRDs receive the Ku downlink signals that contain the conditional access packet, the program guide and the software downloads from the outdoor unit 420. In one configuration, one IRD may be provided for each channel of a DMA.

The IRDs 442 may be in communication with a display such as that illustrated in FIG. 5 or an IRD router 520. The IRD router 520 may be used to route the signals to another location or to a display 522 at the current location of the remote uplink facility.

Figure 7:
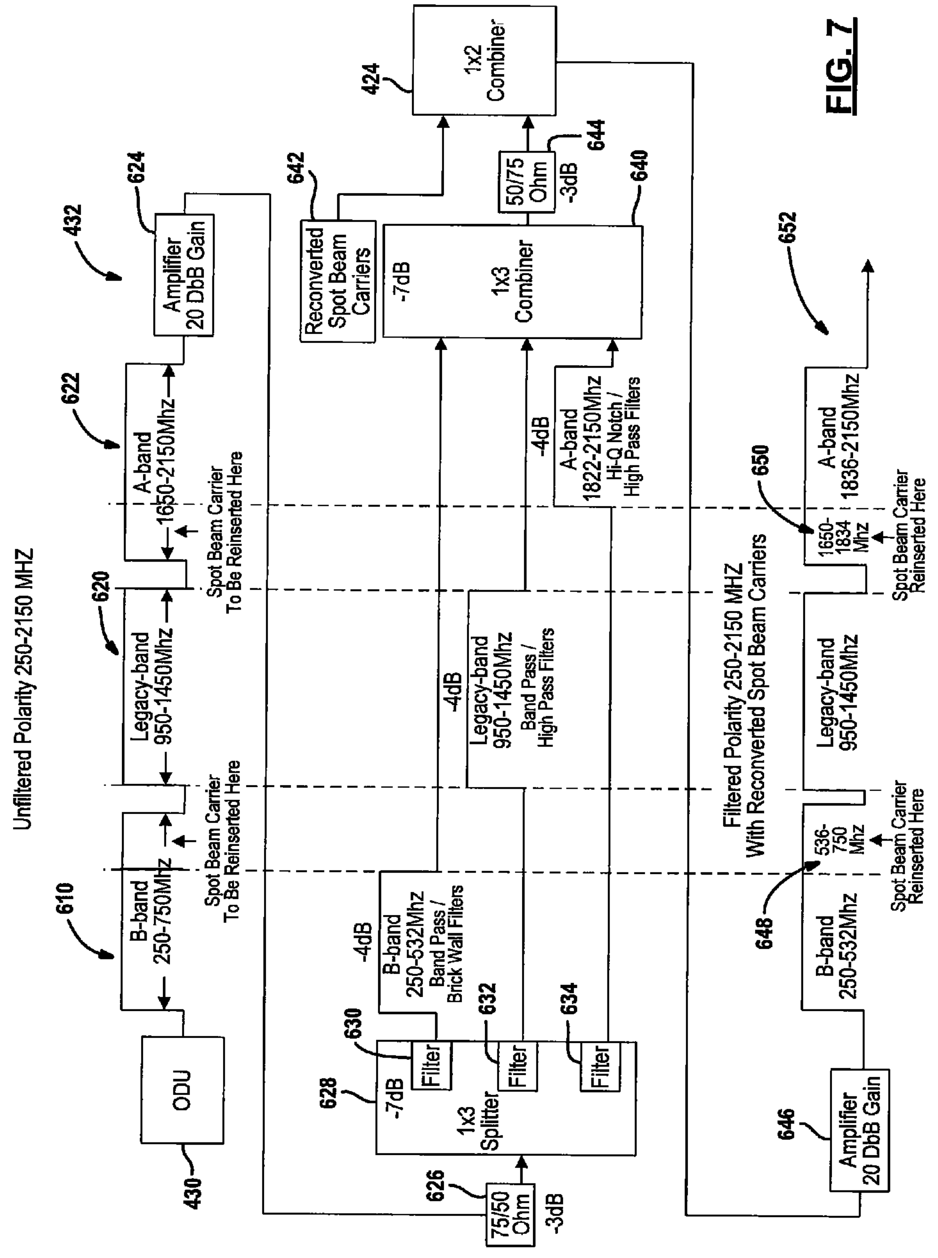
FIG. 7 is a block diagrammatic view with signals for the filtering system illustrated in FIGS. 5 and 6.

Referring now to FIG. 7, a signal diagram, as well as components of the filter, is provided. The signals at the top of the diagram are received through the outdoor unit 430. The signals received at the ODU 430 include nationally broadcasted (CONUS) television signals as well as the spot beam portions corresponding to the location where the monitoring system is located. In FIG. 7, the filtering and combining of the signals are provided in further detail. In the following example, three signals corresponding to three spectrum portions are provided. It should be noted that three portions are used by way of example only. More or fewer signals may be used. A B-band signal 610, a legacy-band signal 620, and an A-band signal 622. The B-band signal, in this example, extends between 250 and 750 MHz. The legacy band signals extend between 950 and 1450 Mhz and the A-band signals extend between 1650 and 2150 Mhz. An amplifier 424, such as a 20 decibel gain amplifier, may be used. The amplified signals may be provided to an impedance matcher 626. The impedance matcher 626 may convert the impedance to a 50 ohm impedance for processing. A splitter 628 may also be included within the filtering systems 432. The splitter 628, in this example, splits the signals into three individual bands and also provides filtering functions illustrated by the filters 634. In this example, the upper filter 630 filters the B-band signal to remove over 532 Mhz. Thus, the B-band signal extends between 250 and 532 Mhz. The filter 630 may be a band-pass and brick wall filter. A band-pass or high-pass filter 632 may be used to split the legacy band signals. The legacy band signals may not chop the legacy band, but rather remove the legacy band from the combined signal. The A-band signal may use a filter 634 such as high-Q notch or high-pass filter for filtering or removing frequencies between 1650 MHz and 1821 MHz from the A-band signal. A signal combiner 640 is used to combine the three signals into one signal.

The reconverted spot beams that are received by the monitoring system through the IP backhaul 432 illustrated in FIG. 5 or as represented by the super beams 512 illustrated in FIG.

6, is provided. The reconverted spot beams 642 are the spot beams for the local area of interest or designated marketing area that are to be monitored. The designated marketing area may be an area outside of the designated marketing area of the monitoring system. The reconverted spot beam carriers are then inserted into the combined filtered signal using the combiner 424 illustrated in both FIGS. 5 and 6. A 50 ohm to 75 ohm impedance matcher 644 may be provided between the combiner 640 and the combiner 424 to reconvert the signals to a 75 ohm impedance.

The combined signals may also be provided to an amplifier 646 such as a 20 DB gain amplifier. As is illustrated near the bottom of FIG. 7, the B-band signal includes the spot beam carriers 648 for the local designated marketing area of interest in the 536 to 750 MHz frequency range. As well, the A-band signal also includes the spot beam carriers 650 for the designated marketing area of interest in the 1650 to 1834 MHz frequency range. Thus, as can be seen, the output signal 652 includes B-band signals that include spot-beam carriers for a designated marketing area of interest that are different than the designated marketing area spot beams removed from the signal that was received at the monitoring system. The output signal 652, in this example, includes the three bands, two of which have spot beams for a designated marketing area other than the spot beam signals of the location of the monitoring system. The RF signals represented by signals 652 are provided to the monitoring set top boxes (IRDs) and are used for monitoring the signal by the operators of the monitoring system. Each of the different frequencies and polarities of the system may be performed in this manner. The output signal may then be provided to the multi-switch 440 or to the RF router 416.

Figure 8:
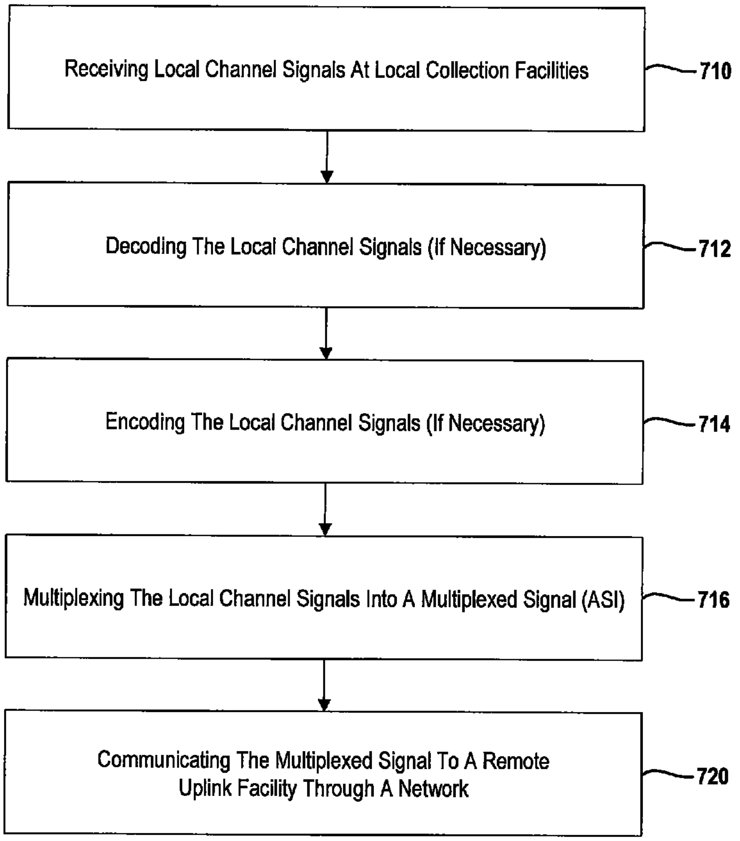
FIG. 8 is a flowchart of a method for collecting signals at a local collection facility.

Referring now to FIG. 8, a method for collecting signals at a local collection facility is set forth. In step 710, local channel signals are received at the local collection facilities. The local channel signals may be received using an antenna or a direct feed. In step 712, the local channel signals may be decoded if necessary. In step 714, the local channel signals may be encoded if necessary. The local collection facility may be located in a particular designated marketing area. In step 716, the local channel signals are multiplexed into an asynchronous serial interface signal. In step 720, the multiplexed signal is communicated to a remote uplink facility through a network.

Figure 9:
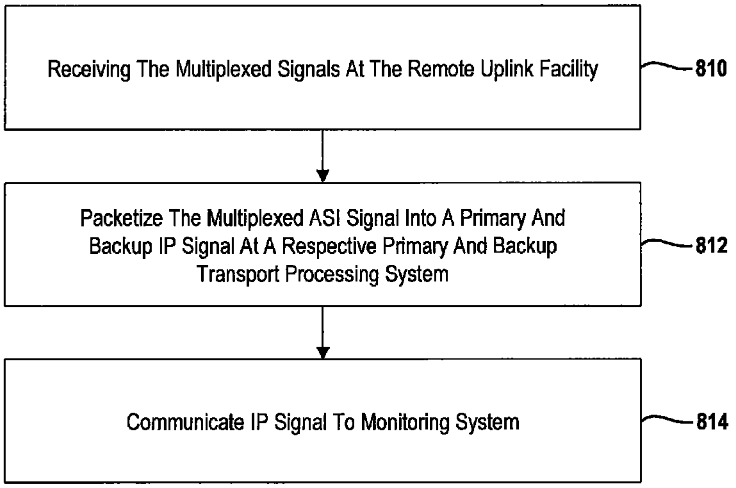
FIG. 9 is a flowchart of a method for collecting signals from different local collection facilities.

Referring now to FIG. 9, the multiplexed signals may be received at the remote uplink facility through a network in step 810. In step 812, the multiplexed ASI signal may be packetized into a primary signal and a back-up signal. A primary ATPS and a back-up ATPS may be used to form the primary and back-up ATPS signal. The packetized signal may be an IP signal. In step 814, the IP signal is communicated to the monitoring system. It should be noted that the remote uplink facilities may receive local signals from various local facilities. Therefore, the IP signals may include local television channel signals from various designated marketing areas.

Figure 10:
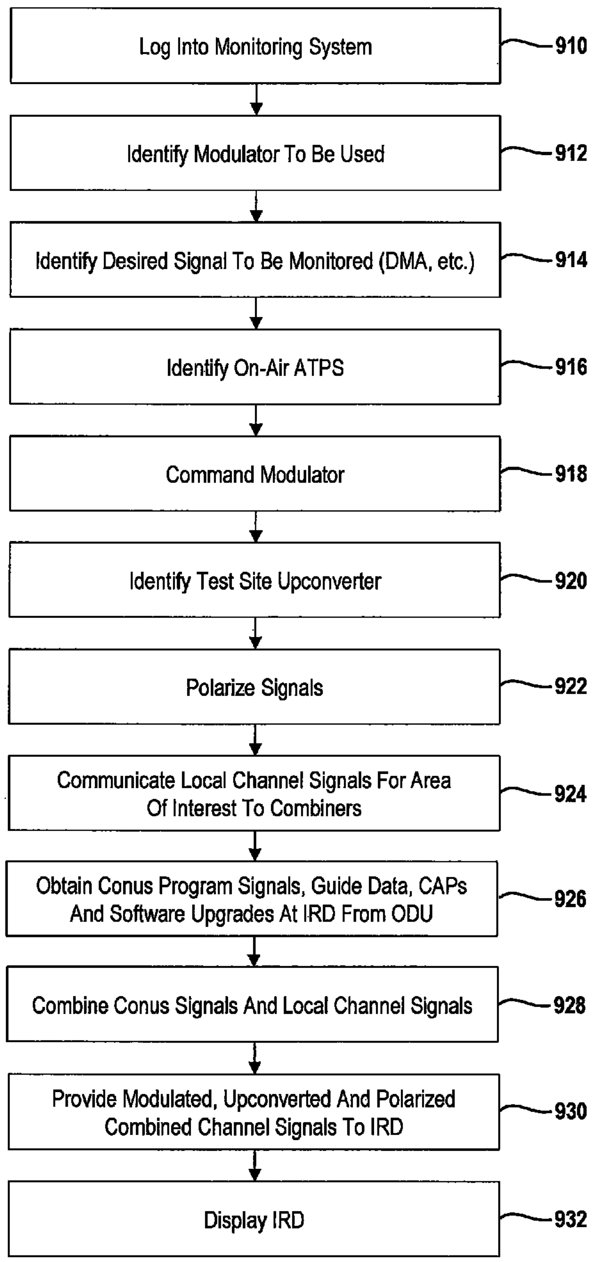
FIG. 10 is a flowchart of a method for operating a monitoring system according to the present disclosure.

Referring now to FIG. 10, a method of operating the monitoring system is set forth. In step 910, an operator of the monitoring system may be required to log into the monitoring system for security purposes. In step 912, the modulator to be used may be selected by the monitoring system operator. In step 914, the signal that is desired to be monitored may be selected. The desired signal may be for a specific designated marketing area. In graphical form, a designated marketing area selection may be made on a screen display associated with the monitoring system. Data such as a network identifier, a transponder identifier, a downlink frequency, and a downlink transponder may all be selected by the system operator. The data corresponding to each channel may also be prestored within the system so manual entry is not required. In that case, the data is retrieved from a table or other memory element. In step 916, the on-line or on-air ATPS may be selected that corresponds with the local signals to be monitored and simulated. As mentioned above, both a primary ATPS and a back-up ATPS may be provided within each remote uplink facility. The status of the ATPS may be provided to the monitoring system. The operator may then determine whether the primary ATPS or the back-up ATPS is on-line.

In step 918, commands may be sent to the modulator of the monitoring system to receive the desired signals. For example, the primary IP address of the multicast group of the local signals may be provided. The primary source address of the multicast group may also be determined. The frequency of the modulator may also be set. The modulation and symbol type may also be set.

In step 920, the upconverter may be identified for a selected transponder identifier. The router may thus be configured to receive the output of a particular module. In step 922, the router may be configured to route the upconverted signal in the desired frequency to a polarizer. In step 922, the signals are polarized.

In step 924, the polarized local channel signals for the area of interest are communicated to the combiners. In step 926, the CONUS signals, the guide data, conditional access packets, and software upgrades are received from the outdoor unit at the monitoring facility. The conditional access packets may be used to authorize the conditional access module and the receipt of various data. Guide data and software upgrades may also be provided to the IRDs. In step 928, the processed local channel signals are combined into the CONUS signals as described above in FIG. 7 to form combined signals for the area of interest. The combined signals represent the RF signals that would be received by an IRD in the area of interest. In step 930, the combined signals that have been modulated, upconverted and polarized signals into the desired format for representing the designated marketing area of interest, are provided to the IRD. In step 932, the channel signals are processed to be displayed on a display associated with the IRD. That is, the IRD may be tuned to a channel signal. When multiple IRDs are used fixed tuned IRDs may be used. A system operator may thus monitor the display IRD. The display is associated with the IRDs to determine whether the channel signals are properly received and that the IRD is operating properly in response to the guide data, software upgrades, authorization signals, and the channel signals.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:

receiving a plurality of local channel signals for a first designated marketing area;

uplinking the plurality of local channel signals to a satellite;

downlinking the plurality of local channel signals from the satellite to form downlink signals using a first downlink frequency in the first designated marketing area;

communicating the plurality of local channel signals through a terrestrial network to a monitoring facility outside the first designated market area;

converting the plurality of local channel signals into RF signals corresponding to the downlink signal and the first downlink frequency at the monitoring facility;

receiving satellite signals at the monitoring facility through an outdoor unit;

filtering local channels from the satellite signals to form filtered signals;

combining the filtered signals and the RF signals to form combined signals;

communicating the combined signals to an input of an integrated receiver decoder within the monitoring facility; and displaying one of the combined signals at a display associated with the integrated receiver decoder.

2. A method as recited in claim 1 wherein receiving a plurality of local channel signals comprises receiving the plurality of channel signals from a local collection facility.

3. A method as recited in claim 1 wherein uplinking the plurality of signals comprises uplinking the plurality of signals to the satellite from a remote uplink facility.

4. A method as recited in claim 1 wherein the satellite signals comprise a national broadcast signal.

5. A method as recited in claim 1 further comprising receiving a program guide signals at the integrated receiver decoder.

6. A method as recited in claim 1 further comprising receiving an authorization signal at the integrated receiver decoder.

7. A method as recited in claim 1 further comprising receiving a software update signal at the integrated receiver decoder.

8. A method as recited in claim 1 further comprising receiving a program guide signals at the integrated receiver decoder from the satellite.

9. A method as recited in claim 1 further comprising receiving an authorization signal at the integrated receiver decoder from the satellite.

10. A method as recited in claim 1 further comprising receiving program guide signals at the integrated receiver decoder from the satellite through an outdoor unit at the monitoring facility.

11. A method as recited in claim 10 wherein prior to receiving the program guide signals filtering the signals from the outdoor unit.

12. A method comprising:

receiving a first plurality of local channel signals at a local collection facility;

receiving a second plurality of local channel signals at a second local collection facility;

communicating at least one of the first plurality of local channel signals and the second plurality of local channel signals to a remote uplink facility through a terrestrial network;

communicating one of the first plurality of local channel signals and the second plurality of local channel signals from the remote facility to a monitoring facility to form selected local channel signals;

converting the selected local channel signals into RF signals at the monitoring facility;

receiving satellite signals at the monitoring facility through an outdoor unit;

filtering local channels from the satellite signals to form filtered signals;

combining the filtered signals and the RF signals to form combined signals;

communicating at least one the combined signals to an input of an integrated receiver decoder within the monitoring facility; and displaying at least one of the combined signals at a display associated with the integrated receiver decoder.

13. A method as recited in claim 12 wherein receiving a first plurality of local channel signals at a first local collection facility comprises receiving a first plurality of local channel signals at the first local collection facility located in a first designated marketing area and wherein receiving a second plurality of local channel signals at a second local collection facility comprises receiving a second plurality of local channel signals at the second local collection facility located in a second designated marketing area different than the first local collection facility.

14. A method as recited in claim 13 wherein communicating at least one of the first plurality of local channel signals and the second plurality of local channels from the remote facility to a monitoring facility to form selected channel signals comprises communicating at least one of the first plurality of local channel signals and the second plurality of local channel signals from the remote facility to the monitoring facility located outside the first designated marketing area and the second designated marketing area.

15. A method as recited in claim 12 wherein communicating the first plurality of local channel signals and the second plurality of local channel signals to a remote uplink facility through a terrestrial network comprises communicating the first plurality of local channel signals and the second plurality of local channel signals to the remote uplink facility through an internet protocol terrestrial network.

16. A method as recited in claim 12 wherein the satellite signal comprises a national broadcast signal.

17. A method as recited in claim 12 wherein converting the selected channel signals into RF signals comprises modulating the selected channel signals into RF signals.

18. A method as recited in claim 12 wherein converting the selected channel signals into RF signals comprises upconverting the selected channel signals into RF signals.

19. A method as recited in claim 18 further comprising after upconverting, polarizing the channel signals.

20. A method as recited in claim 12 wherein converting the selected channel signals into RF signals comprises polarizing the selected channel signals into RF signals.

21. A method as recited in claim 12 wherein converting the selected channel signals into RF signals comprises upconverting, modulating and polarizing the selected channel signals into RF signals.

22. A method as recited in claim 21 further comprising downlinking the channel signals having a first format and wherein upconverting, modulating and polarizing the selected channel signals into RF signals comprises upconverting, modulating and polarizing the selected channel signals into RF signals to correspond to the first format.

23. A method as recited in claim 12 further comprising receiving program guide signals at the integrated receiver decoder.

24. A method as recited in claim 12 further comprising receiving an authorization signal at the integrated receiver decoder.

25. A method as recited in claim 12 further comprising receiving a software update signal at the integrated receiver decoder.

26. A method as recited in claim 12 further comprising receiving a program guide signals at the integrated receiver decoder from a satellite.

27. A method as recited in claim 12 further comprising receiving an authorization signal at the integrated receiver decoder from a satellite.

28. A method as recited in claim 12 further comprising receiving a program guide signals at the integrated receiver decoder from a satellite through an outdoor unit at the monitoring facility.

29. A method as recited in claim 28 wherein prior to receiving the program guide signals filtering the signals from the outdoor unit.

30. A system comprising:

a monitoring system for receiving a plurality of local channel signals and for converting channel signals into RF signals, said monitoring system receiving satellite signals through an outdoor unit and filtering the local channel signals from the satellite signals to form national feeds;

a combiner combining the RF signals with the national signals to form combined signals within the monitoring system;

an integrated receiver decoder;

a router communicating at least one of the combined signals to an input of the integrated receiver decoder within the monitoring system; and a display associated with the integrated receiver decoder displaying one of the RF signals.

31. A system as recited in claim 30 further comprising a first local collection facility receiving the plurality of local channels; and a remote uplink facility receiving the plurality of local channel signals and uplinking the plurality of local channel signals to a satellite to form downlink signals having a first format and terrestrially communicating the plurality of signals to the monitoring system.

32. A system as recited in claim 31 wherein the first local collection facility is disposed in a first designated marketing area and the monitoring facility is disposed in a second designated marketing area different that the first designated marketing area.

33. A system as recited in claim 32 wherein the monitoring system converts the plurality of local channel signals into RF signals having the first format.

34. A system as recited in claim 32 wherein the monitoring system converts the plurality of channel signals into RF signals using a modulator.

35. A system as recited in claim 32 wherein the monitoring system converts the plurality of channel signals into RF signals using a modulator and a polarizer.

36. A system as recited in claim 32 wherein the monitoring system converts the plurality of channel signals into RF signals using a modulator, an upconverter, and a polarizer.

37. A system as recited in claim 31 further comprising a second local collection facility receiving a second plurality of channel signals and communicating the second plurality of local channel signals to the remote uplink facility, wherein the second plurality of local channel signals is communicated to the monitoring system by the remote uplink facility.

* * * * *